(12) United States Patent
Kohn (10) Patent No.: US 6,402,159 B1
(45) Date of Patent: Jun. 11, 2002

(54) DIELECTRIC GASKET (76) Inventor: Gary A. Kohn, 2101 Cannes Dr., Carrollton, TX (US) 75006

( * ) Notice: Subject to any disclaimer, the term of this patent is extended or adjusted under 35 U.S.C. 154(b) by 0 days.

(21) Appl. No.: 09/573,084

(22) Filed: May 18, 2000

Related U.S. Application Data (63) Continuation-in-part of application No. 09/049,883, filed on Mar. 27, 1999, now abandoned.
(60) Provisional application No. 60/042,718, filed on Apr. 8, 1997.

(51) Int. Cl.$^7$ .................................................. F16J 15/12
(52) U.S. Cl. ........................ 277/608; 277/611; 277/627; 277/641; 277/651
(58) Field of Search ................................ 277/608, 611, 277/612, 627, 641, 650, 651, 652, 653, 935, 938, 944

(56) References Cited

U.S. PATENT DOCUMENTS

| | | | |
|---|---|---|---|
| 3,575,431 A | 4/1971 | Bryant | 277/171 |
| 4,406,467 A | 9/1983 | Burger et al. | 277/105 |
| 4,776,600 A | 10/1988 | Kohn | 277/101 |
| 5,316,320 A | 5/1994 | Breaker | 277/233 |
| 5,333,913 A | 8/1994 | Stallard, III | 285/48 |
| 5,407,214 A | 4/1995 | Lew et al. | 277/26 |
| 5,427,386 A | 6/1995 | Breaker | 277/26 |
| 5,518,257 A | 5/1996 | Breaker | 277/180 |
| 5,564,715 A | 10/1996 | Wallace | 277/58 |
| 6,139,026 A | * 10/2000 | Gruver, III et al. | |
| 6,290,237 B1 | * 9/2001 | Graupner | |

FOREIGN PATENT DOCUMENTS

DE    9403963    3/1994

OTHER PUBLICATIONS

PCT International Search Report dated Jun. 30, 1998 for Internation application No. PCT/US98/07245, filed Apr. 7, 1998.
"Pikotek Engineering Solutions Today for Tomorrow's Problems, The Ultimate in Electrical Insulating Flange Gaskets!"—brochure distributed prior to 1987.

* cited by examiner

Primary Examiner—Anthony Knight
Assistant Examiner—John L. Beres
(74) Attorney, Agent, or Firm—Baker Botts L.L.P.

(57) ABSTRACT

A dielectric gasket (10) includes an outer annular disk (50) and an inner annular disk (56) both formed, at least in part, from electrically non-conducting materials. A seal (54) is disposed between an inside diameter (58) of the outer annular disk (50) and an outside diameter (62) of the inner annular disk (56). The outer annular disk (50), the inner annular disk (56), and the seal (54) operate to form an insulating barrier of electrically non-conducting material between adjacent pipe flanges (12, 14).

37 Claims, 3 Drawing Sheets

FIG. 1

DIELECTRIC GASKET

CROSS-REFERENCE TO RELATED APPLICATIONS

This application is a continuation-in-part of Application Ser. No. 09/049,883 filed Mar. 27, 1999, abandoned entitled, Dielectric Gasket by Gary A. Kohn now abandoned.

This application claims priority under 35 U.S.C. § 119(e) of provisional application number 60/042,718, filed Apr. 8, 1997.

TECHNICAL FIELD OF THE INVENTION

This invention relates in general to the field of pipe line gaskets, and more particularly to a dielectric gasket for preventing galvanic corrosion of pipe lines.

BACKGROUND OF THE INVENTION

Pipe lines are used throughout the world to transport many different materials over long and short distances and over some of the most remote and populated areas of the world. Some of the most common materials transported are oil, gas, and water. For example, the $8 billion dollar Trans Alaska Pipeline transports crude oil across more than 800 miles of environmentally sensitive and remote land. Typically, a pipe line is constructed by welding individual joints of pipe into long sections. Pipe lines also incorporate pipe flanges to join sections together for various reasons. A gasket is typically used to form a seal between mating pipe flanges.

A leak in a pipe line can be extremely expensive. In order to repair the leak, the pipe line must often be shut down and the material in the pipe line removed before repairs can be made. In many cases, material that leaked from the pipe line must then be cleaned from the surrounding environment. A remote location or treacherous environment can make a leak in a pipe line even more expensive and dangerous to repair.

Many leaks in pipe lines are the result of leakage from a gasket or corrosion of a pipe flange. A gasket must be capable of sealing the joints of a pipe line for an indefinite period in a harsh environment. Since metallic joints of pipe in a pipe line may conduct electricity, the gasket may also be used to prevent external corrosion along buried sections of the pipe line. A dielectric gasket inhibits this form of corrosion by forming an electrical insulating barrier between pipe flanges that prohibits electricity from passing onto the next section of the pipeline.

Previously developed dielectric gaskets have suffered from numerous disadvantages. One disadvantage in prior dielectric gaskets is that dielectric gaskets which incorporate seal grooves in the face of the gasket often form cracks between the seal grooves. Cracks between the seal grooves reduce the strength of the gasket and may propagate through the sealing surfaces of the gasket, resulting in a leak in the dielectric gasket.

A further disadvantage of many dielectric gaskets is that they often necessitate expensive stainless steel metals. Metal is often used to form a metal backbone in a gasket for high pressure applications. In high pressure applications, the metal backbone is typically placed in contact with the material being transported. Expensive stainless steel is often needed for such applications to prevent corrosion of the metal backbone. In addition, in some situations the material being transported will chemically react with and corrode even a stainless steel backbone, causing the gasket to fail.

Some dielectric gaskets are constructed using soft dielectric materials. However, soft dielectric gaskets are easily over-compressed by over-torquing the tie rods. The over-compression forces the soft dielectric material in the gasket to deform and damage the seals or the sealing surfaces of the gasket. Another problem with soft dielectric gaskets is that over-compression can also cause the soft dielectric material to deform in such a manner that the flanges of the pipe contact each other and short-out the dielectric gasket, rendering the dielectric gasket useless.

Other dielectric gaskets are constructed of hard dielectric materials, which require very high tie rod torques in order to form a seal between the two joints of pipe. Although these dielectric gaskets do not readily deform, they are susceptible to cracking under the high loads required to form a seal between the pipe flanges. An additional problem is that these gaskets often do not employ ring type seals in their construction and are therefore vulnerable to wicking. Wicking occurs when the material being transported in the pipe line seeps into the gasket material. Wicking can reduce the material properties of the gasket and can cause a leak in the pipe line or a blow-out of the seal.

Dielectric gaskets are also used to prevent galvanic corrosion between mating flanges of dissimilar metals such as stainless steel and carbon steel. Such flange connections may be used on indoor piping systems such as enclosed process facilities on land or on offshore platforms used to produce oil and gas. In such cases consideration is often given to the possible outbreak of fire and the effect of fire on flange connections. Dielectric gaskets for high pressure with metal backbones conduct heat along the metal backbone directly to the seal grooves. Because of the thermal insulating properties of the dielectric material bonded to the faces of the metal backbone, the heat is confined and intensely directed along the metal backbone. Elastomeric or thermoplastic seals in direct contact with the metal backbone, when exposed to such temperatures, can be damaged or destroyed to the point that they will not function.

SUMMARY OF THE INVENTION

Accordingly, a need has arisen for an improved dielectric gasket. The present invention provides a dielectric gasket that substantially eliminates or reduces problems associated with prior dielectric gaskets.

In accordance with one embodiment of the present invention, a dielectric gasket comprises an inner annular disk and an outer annular disk with each disk formed from electrically non-conductive materials. A fluid seal is preferably disposed between the inner annular disk and the outer annular disk.

In another embodiment of the present invention, the dielectric gasket includes a single annular disk formed from at least two distinct rings. In this embodiment, rings are formed in part from two different electrically non-conducting materials, each ring having a first face and a second face. The inner ring is formed from a material resistant to wicking. At least one seal groove is formed within each face of the inner ring of the annular disk with a fluid seal disposed within each seal groove. A pressure communication passage may be formed in the inner ring of the annular disk between corresponding seal grooves located on opposite faces of the annular disk.

In each of the embodiments, a ring stiffener may be disposed within a first face and a second face of the annular disk outboard to the seal(s). The ring stiffeners are physically separated from each other by a portion of the electrically non-conducting material of the outer annular disk in order to insulate the ring stiffeners from each other.

Additionally, in each of the embodiments, a metal backbone or central stiffener may be disposed within the outer annular disk. The present invention maintains a layer of electrically non-conducting material on the inside surface of the outer annular disk and between each pipe flange even when water or other electrically conductive fluids are present.

This invention provides a number of important technical advantages over previous pipeline gaskets, one technical advantage is that the central stiffener and the ring stiffeners provide a backbone to the dielectric gasket that prevents the dielectric gasket from being blown-out under high pressure or high temperature operating conditions. In addition, the central stiffener and ring stiffeners provide structural rigidity to the gasket.

A further technical advantage of the present invention is that the fluid seal prevents wicking from the inner annular seal to the outer annular seal.

A further technical advantage of the present invention is that the electrically non-conducting material will not separate from the metal backbone or stiffener during high pressure operation.

Another technical advantage of the present invention is that the dielectric gasket can withstand mistreatment during installation and continue to operate as intended. Specifically, the present invention will form a desired fluid seal and maintain its integrity as an electrical insulator even when the associated tie rods are improperly torqued. In addition, the present invention does not require high tie rod torques that are often needed when installing a dielectric gasket formed from a hard dielectric material.

Yet another technical advantage of the present invention is that wicking of fluid or material being transported by the pipe line into the gasket material is avoided, thereby reducing the possibility of a blow-out or a fluid leak.

Another technical advantage of the present invention is that damage to the fluid seal from heat due to exposing the external surfaces of the gasket to fire is mitigated.

A further technical advantage of the present invention includes providing a low cost dielectric gasket. In particular, low cost materials may be used in various components of the dielectric gasket to reduce costs and provide a wide spectrum of applications and uses.

Yet another technical advantage of the present invention includes providing a dielectric gasket constructed of individual components which may be mechanically assembled; thereby allowing the seal and other components to be separately manufactured and later assembled into a complete gasket.

Other technical advantages of the present invention will be readily apparent to one skilled in the art from the following figures, descriptions, and claims.

BRIEF DESCRIPTION OF THE DRAWINGS

For a more complete understanding of the present invention and the advantages thereof, reference is now made to the following description taken in conjunction with the accompanying drawings, wherein like reference numerals represent like features, in which.

DETAILED DESCRIPTION OF THE INVENTION

FIGS. 1 through 6 illustrate several embodiments of a dielectric gasket incorporating teachings of the present invention. In one embodiment, the dielectric gasket includes an outer annular disk and an inner annular disk formed of electrically non-conducting material with a seal disposed between the outer and inner annular disks. Stiffeners may be disposed within the outer annular disk to provide structural rigidity to the dielectric gasket. The dielectric gasket operates to substantially reduce or eliminate electrical conductivity between two flanges so as to stop the corrosion process often associated with prior pipe line gaskets and also reduces wicking or cracking of the gasket during operation.

Figure 1:
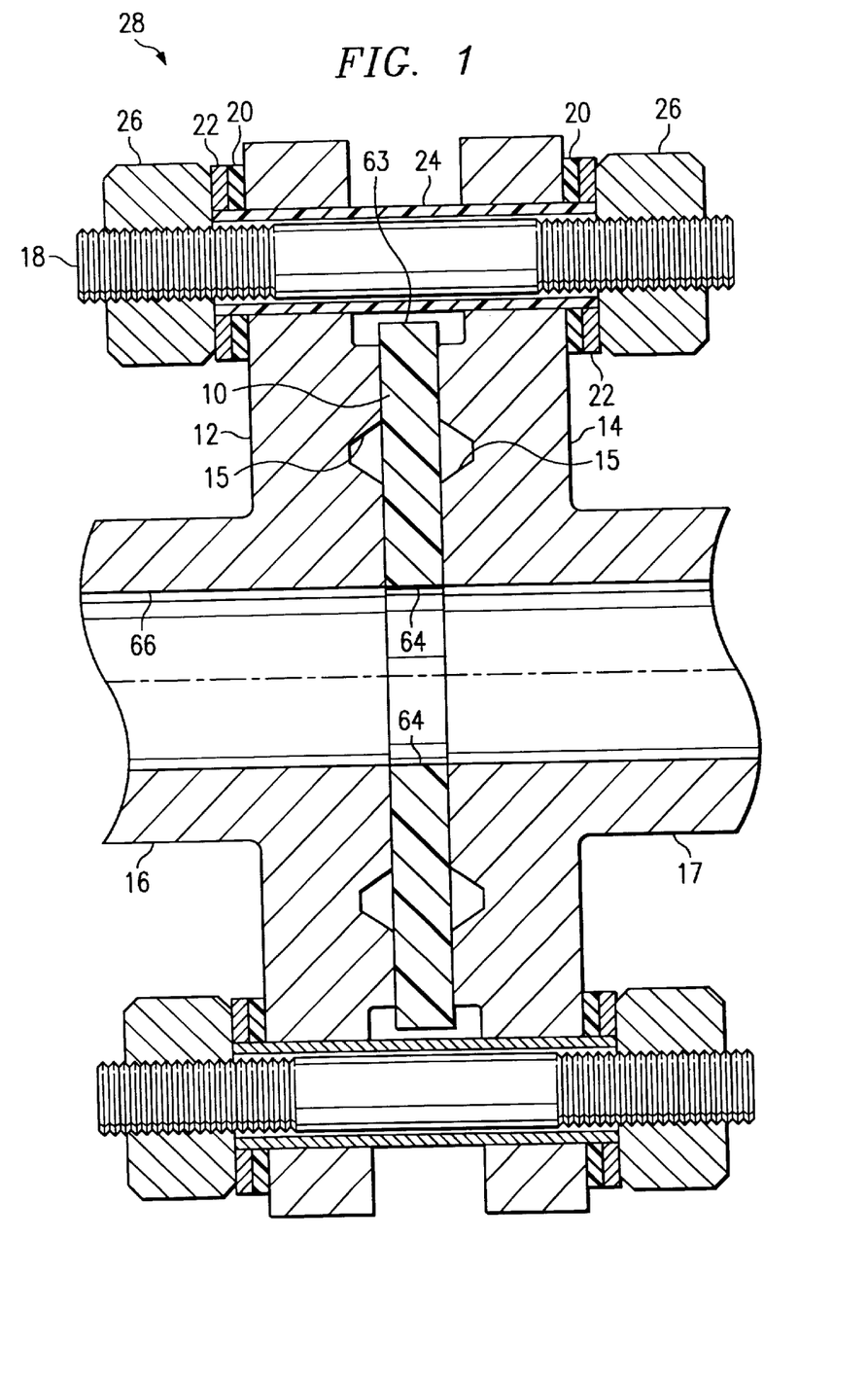
FIG. 1 is a schematic drawing in section illustrating a gasket disposed between two pipe flanges.

FIG. 1 shows a typical completed connection in pipe line 28 between pipe joint 16 and pipe joint 17. Pipe joint 16 is connected to pipe joint 17 through pipe flanges 12 and 14, respectively. Dielectric gasket 10 is shown installed between pipe flanges 12 and 14. Multiple embodiments of dielectric gasket 10 will be discussed in detail below. Tie rods 18 are used in conjunction with nuts 26 and washers 22 to compress dielectric gasket 10 between pipe flanges 12 and 14 to form the associated pipe line 28. Dielectric washers 20 and dielectric sleeves 24 cooperate with dielectric gasket 10 to form an electrically non-conducting barrier between pipe flanges 12 and 14, which prevents electricity from flowing between pipe joint 16 and pipe joint 17, thereby inhibiting galvanic corrosion. Pipe flanges 12 and 14 may include flange channel 15 which may be used to install a standard seal (not expressly shown) between pipe flanges 12 and 14.

Outside diameter 63 of dielectric gasket 10 is generally sized such that dielectric gasket 10 will not interfere with tie rod 18 or dielectric sleeve 24. Similarly, inside diameter 64 of dielectric gasket 10 is generally sized to match internal diameter 66 of pipe joints 16 and 17 in order to reduce friction within pipe line 28.

Figure 2A:
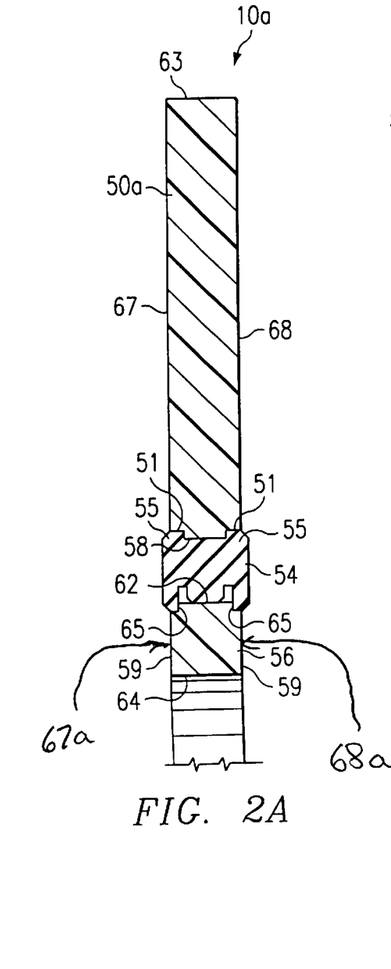
FIG. 2A is a schematic drawing in section with portions broken away illustrating a dielectric gasket in accordance with one embodiment of the present invention.
Figure 2B:
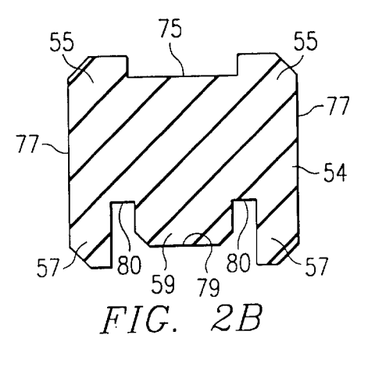
FIG. 2B is a schematic drawing in section illustrating a seal in accordance with one embodiment of the present invention.

According to one embodiment of the present invention, as shown in FIGS. 2A and 2B, dielectric gasket 10a comprises an outer annular disk 50a, an inner annular disk 56, and a seal 54 disposed between outer annular disk 50a and inner annular disk 56. Dielectric gasket 10a has an outer diameter 63 and an inner diameter 64. Outer annular disk 50a is formed, at least in part, from electrically non-conducting material and has an internal diameter 58 and an outside diameter which corresponds to outer diameter 63 of dielectric gasket 10a. Outer annular disk 50a further includes two substantially parallel faces 67 and 68 and rabbit grooves 51 formed on the edge of each face at the inner diameter 58. Inner diameter 58 is preferably substantially perpendicular to the two substantially parallel faces 67 and 68 of outer annular disk 50a.

Inner annular disk 56 may be formed from electrically non-conducting material and has an outside diameter 62 and an internal diameter which corresponds to inner diameter 64 of dielectric gasket 10a. Inner annular disk 56 has two substantially parallel faces 67a and 68a and outside diameter 62 is substantially perpendicular to the faces 67a and 68a. Inner annular disk 56 further includes rabbit grooves 65 formed on the edge of each face at outside diameter 62. Inner annular disk 56 is preferably concentrically disposed within the inside diameter of outer annular disk 50a.

Outer annular disk 50a and inner annular disk 56 may be formed from the same electrically non-conducting material. According to one embodiment of the present invention, outer annular disk 50a and inner annular disk 56 are formed from a single piece of electrically non-conducting material whereby outer annular disk 56 and inner annular disk 50a form a matched set. In another embodiment, inner annular disk 56 is formed from a different electrically non-conducting material as compared to the outer annular disk 50a. In yet another alternative embodiment, inner annular disk 56 and outer annular disk 50a are fabricated from electrically non-conducting fire resistant materials.

Seal 54 may also be formed from electrically non-conducting material, such an electrically non-conducting thermoplastic material. Seal 54 may be formed from an elastomer such as rubber, a non-elastomer such as polytetrafluoroethylene (PTFE) or urethane, or any other suitable material without departing from the scope of the present invention. In addition, seal 54 may have a c-shaped, circular, or square cross-section, or any other suitable shape without departing from the scope of the present invention.

Seal 54, may also be a unitary seal, of dielectric means, constructed of two or more components, with material selectively embedded within the seal for supplementing mechanical performance.

In the present embodiment, seal 54 includes nubbins 55 formed on the edges of the outside diameter of seal 54. Nubbins 55 are preferably formed to mate with rabbit grooves 51. Seal 54 is preferably disposed between the inside diameter 58 of outside annular disk 50a and the outside diameter 62 of inner annular disk 56. Outside diameter 75 of seal 54 formed such that seal 54 may be slidably disposed inside of outer annular disk 50a. The slidable disposition of seal 54 inside outer annular disk 50a substantially prohibits relative concentric movement between outer annular disk 50a and seal 54. Nubbins 55 are preferably registered into rabbit grooves 51 such that relative axial movement between outer annular disk 50a and seal 54 is substantially prohibited.

Seal 54 further includes circumferential grooves 80 formed within inside diameter 79 of seal 54. Circumferential grooves 80 are substantially parallel to one another and to seal faces 77. Grooves 80 form cantilevered seal faces 57 that are preferably operable to deflect to allow inner annular disk 56 to be slidably disposed adjacent seal 54 such that relative concentric movement between outer annular disk 50a, seal 54, and inner annular disk 56 is substantially prohibited. Cantilevered seal faces 57 are preferably formed to mate with rabbit grooves 65 such that relative axial movement between inner annular disk 56 and seal 54 is substantially prohibited. The face to face thickness of seal 54 is preferably greater than the face to face thickness of inner annular disk 56 and outer annular disk 50a.

Seal 54 further includes pedestal 59 extending from inside diameter 79. Pedestal 59 may be referred to as a circumferential pedestal and is preferably positioned between grooves 80, such that a void is created in a portion of grooves 80 when gasket 10a is assembled. In one embodiment, pedestal 59 is centered between grooves 80. Seal 54 preferably deforms into the available void volume of the circumferential grooves 80 when seal 54 is compressed. Seal 54 further bridges the faces of outer annular disk 50a and inner annular disk 56 when nubbins 55 are compressed into outer annular disk 50a rabbit grooves 51 and cantilevered faces 57 are compressed into inner annular disk 56 rabbit grooves 65.

Seal 54, outer annular disk 50a and inner annular disk 56 may be separately manufactured and mechanically assembled to form gasket 10a. In one particular embodiment, seal 54 may be mechanically disposed inside of outer annular disk 50a. Inner annular disk 56 may then be mechanically disposed inside seal 54. This may be described as "snapping" seal 56 into seal 54. The mechanical assembly of seal 54, inner annular disk 56 and outer annular disk 50a is advantageous because seal 54, inner annular disk 56, and outer annular disk 50a may be manufactured as individual component parts from various materials and later assembled. This aspect of the present invention reduces the need for injection molding or other similar processes to dispose seal 54 between inner annular disk 56 and outer annular disk 50a. Additionally, the mechanical assembly of gasket components is also applicable to gaskets which include stiffeners as shown in FIGS. 3a and 4.

In one embodiment seal 54 is preferably formed from engineered materials for preventing the transport of gas and liquids to outer annular disk 50a. The engineered materials may include, but are not limited to, thermoplastics or elastomers. In another embodiment, seal 54 may be formed from two or more components (not expressly shown) with material selectively embedded within the seal for supplementing the mechanical performance of seal 54. In another alternative embodiment, seal 54 is preferably formed from an electrically non-conducting material that is fire resistant such as commercially available flexible graphite material.

During installation, nuts 26 on tie rods 18 are torqued to provide compressive loading of dielectric gasket 10a. Pipe flanges 12 and 14 are compressed against first face 67 and second face 68, respectively, of dielectric gasket 10a. Seal 54 is thereby compressed and forms a seal to stop leakage of the material being transported inside pipe line 28. The seal 54 prevents wicking of the material being transported and may also reduce the negative effects of torquing errors.

Figure 3A:
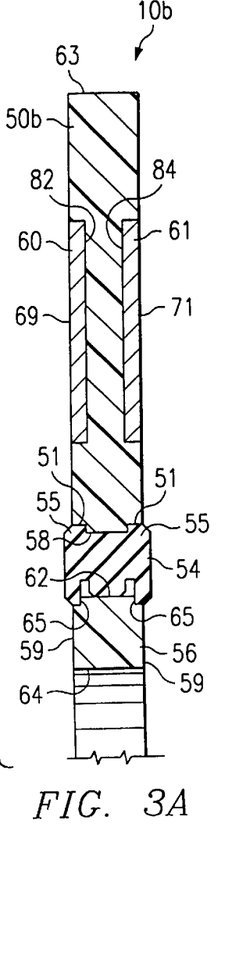
FIG. 3A is a schematic drawing in section with portions broken away illustrating a dielectric gasket in accordance with an embodiment of the present invention.
Figure 3B:
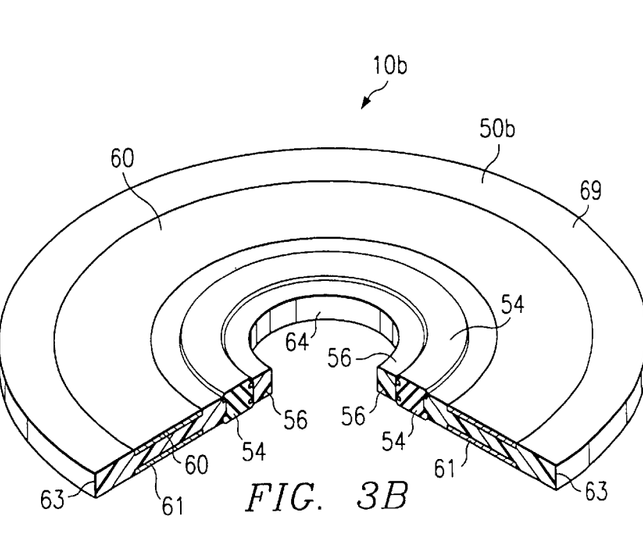
FIG. 3B is a perspective view with portions broken away of the dielectric gasket shown in FIG. 3A.
Figure 4:
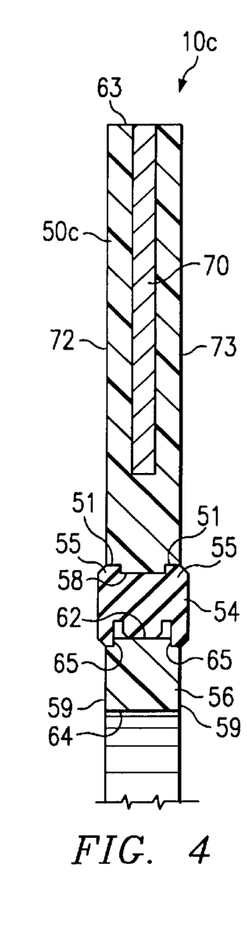
FIG. 4 is a schematic drawing in section with portions broken away illustrating a dielectric gasket in accordance with an embodiment of the present invention.

According to another embodiment of the present invention, as shown in FIGS. 3A and 3B, dielectric gasket 10b includes an outer annular disk 50b, an inner annular disk 56, and a seal 54 disposed between outer annular disk 50b and inner annular disk 56. Outer annular disk 50b is formed, at least in part, from electrically non-conducting material. First facial groove 82 is formed in first face 69, second facial groove 84 is formed in second face 71. Ring stiffeners 60 and 61 preferably have a face to face thickness less than one half of the thickness of outer annular disk 50b, an inside diameter greater than the inside diameter of outer annular disk 50b, and an outside diameter less than or equal to the outside diameter 63 of outside annular disk 50b.

First ring stiffener 60 and second ring stiffener 61 are disposed within first face 69 and second face 71 of outer annular disk 50b, respectively, to provide additional strength and wear-resistance to dielectric gasket 10b. More specifically, first ring stiffener 60 and second ring stiffener 61 are disposed within first facial groove 82 and second facial groove 84 substantially flush with the face of outer annular disk 50b. Further, the inside and outside diameters of ring stiffeners 60 and 61 are disposed adjacent the mating surfaces of facial grooves 82 and 84. Ring stiffeners 60 and 61 are physically separated by a layer of electrically non-conducting material, thereby maintaining an electrically insulating barrier between adjoining pipe flanges 12 and 14.

The face to face thickness of ring stiffeners 60 and 61 is generally larger for gaskets 10b designed for high pressure applications than compared to gaskets 10b designed for lower pressure applications. The face to face thickness of the outer annular disk 50b does not change in accordance with changes to the face to face thickness of ring stiffeners 60 and 61. The thickness of the electrically non-conducting material between ring stiffeners 60 and 61 changes in accordance with changes to the face to face thickness of ring stiffeners 60 and 61 such that the face to face thickness of gasket 10b, seal 54, and inner annular disk 56 does not change. Further, facial grooves 82 and 84 may be sized to accommodate different sized ring stiffeners 60 and 61. For example, if the face to face thickness of ring stiffeners 60 and 61 is selected to be thicker than shown in FIGS. 3A and 3B, facial grooves 82 and 84 may be enlarged to accommodate the thicker ring stiffeners and the thickness of the non-conducting material between stiffeners 60 and 61 will be decreased by the combined additional thickness of stiffeners 60 and 61. The face to face thickness of gasket 10b, seal 54, and inner annular disk 56 will remain unchanged. The present invention allows modifying gasket 10b to accommodate a wide variety of different fluids and fluid pressures without requiring changes to the overall dimensions of gasket 10b.

Ring stiffeners 60 and 61 reduce the effect of high compression loading on dielectric gasket 10b by reducing the opportunity for deformation of the electrically non-conducting material into flange channel 15. Ring stiffeners 60 and 61 reduce the thickness of the dielectric material between the stiffeners, thereby reducing the possibility of a failure and blow-out of dielectric gasket 10b under pressure. Ring stiffeners 60 and 61 add rigidity to dielectric gasket 10a, thereby improving the ability of the gasket to withstand abuse during installation and maintain the ability to form a seal and an electrical barrier between pipe flanges 12 and 14. Ring Stiffeners 60 and 61 are located inboard of outside diameter 63 and do not readily conduct heat to seal 54 if dielectric gasket 10b is exposed to fire. Ring stiffeners 60 and 61 may be formed from any suitable material having the desired material strength and wear characteristics, including electrically conducting materials, such as metals, without departing from the scope of the present invention.

In one embodiment, ring stiffeners 60 and 61 may be manufactured from standard sheet metal products, engineered sheet metal products, or bimetallic sheet metal products. Further, ring stiffeners 60 and 61 may be formed with a flat or contoured surface. Ring stiffeners 60 and 61 may also include holes selectively punched through the stiffeners 60 and 61 or portions of stiffeners 60 and 61 selectively removed using a laser cutting technique, an EDM technique, simple machining or another suitable technique.

According to another embodiment of the present invention, portions of ring stiffeners 60 and 61 exposed after assembly are preferably coated with a semi-hard engineered material such as a plastic or resin material. Such coating can prevent rusting on the face of the stiffeners 60 and 61, extending the gasket's shelf life. Such coating can reduce the risk of the gasket's stiffener damaging a phenolic or epoxy based coating on the face of a standard metal flange.

According to another embodiment of the present invention, as shown in FIG. 4, dielectric gasket 10c includes an outer annular disk 50c, an inner annular disk 56, and a seal 54 disposed between outer annular disk 50c and inner annular disk 56.

Outer annular disk 50c is formed, at least in part, from electrically non-conducting material. Central stiffener 70 is disposed within outer annular disk 50c. In this particular embodiment, stiffener 70 is a metal core in an encapsulated, medial position within the outer annular disk 50c. The electrically non-conducting material of outer annular disk 50c surrounding central stiffener 70 may form first face 72 and second face 73 of outer annular disk 50c. Central stiffener 70 may be a small ring completely surrounded by the electrically non-conducting material or may extend from the outside diameter 63 of dielectric gasket 10c to the inner diameter 58 of outer annular disk 50c without departing from the scope of the present invention. In one embodiment, stiffener 70 has a face to face thickness less than that of the outer annular disk 50c and has an inside diameter greater than the inside diameter of outer annular disk 50c and an outside diameter equal to the outside diameter 63 of outer annular disk 50c.

For gaskets with high pressure ratings, the face to face thickness of stiffener 70 is preferably larger than it is for gaskets with lower pressure ratings. The face to face thickness of outer annular disk 50c does not change with changes to the face to face thickness of stiffener 70. However, the thickness of the electrically non-conducting material on the faces of outer annular disk 50c changes in accordance with changes to the face to face thickness of stiffener 70. For example, in a particular embodiment, if the thickness of stiffener 70 is increased, the non-conductive material on the face of outer annular disk 50c is thinner such that the total thickness of outer annular disk is unchanged. The thickness of seal 54 and inner annular disk 56 does not change in accordance with changes to the thickness of stiffener 70.

In one embodiment, stiffener 70 may be a metal core manufactured from any suitable metal. Suitable metals include, but are not limited to, standard sheet metal materials, engineered sheet metal products, and bi-metallic sheet metal products. The stiffener 70 may be machined, pressed, or otherwise formed into a final engineered shape. The engineered shape of stiffener 70 may be flat or contoured shape and may include holes selectively punched or formed within the stiffener or portions selectively removed from the stiffener. Portions may be removed from central stiffener 70, for example, by using a laser cutting technique, a water cutting technique, an EDM technique, simple machining, or another suitable technique. Removing portions of central stiffener 70 just inboard of outside diameter 63 reduces the ability of central stiffener 70 to readily conduct heat to seal 54 if dielectric gasket 10c is exposed to fire.

The electrically non-conducting material located on each side of central stiffener 70 operates as an electrical insulating barrier between pipe flanges 12 and 14. Central stiffener 70 provides stiffness to dielectric gasket 10c to reduce the possibility of a failure and blow-out of the gasket under pressure. Additionally, central stiffener 70 reduces the deformation of the electrically non-conducting material of dielectric gasket 10c. Central stiffener 70 may be formed from any suitable material having the desired material strength characteristics, including electrically conducting materials, such as metals, without departing from the scope of the present invention.

Figure 5:
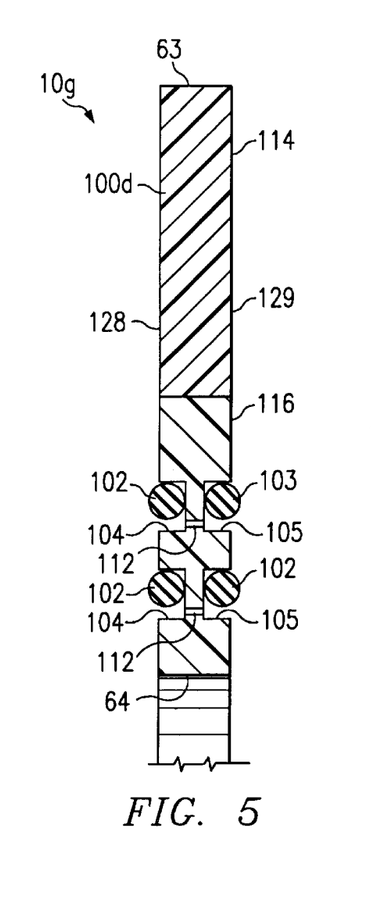
FIG. 5 is a schematic drawing in section with portions broken away illustrating a dielectric gasket in accordance with an embodiment of the present invention.

According to another embodiment of the present invention, as shown in FIG. 5, dielectric gasket 10g includes a first annular ring 114 and second annular ring 116. Second annular ring 116 of annular disk 100d includes one or more seal grooves 104 in first face 128 and one or more seal grooves 105 in second face 129. A pressure communication passage 112 may be formed in second annular ring 116 of annular disk 100d between corresponding seal grooves 104 and 105. First annular ring 114 and second annular ring 116 may be manufactured from different materials without departing from the scope of the present invention. In one embodiment first annular ring 114 may be formed from a thermosetting resin with a woven cloth fibrous reinforcement material to enhance and maximize compressive and flexural strength, and the second annular ring 116 may be formed from a thermosetting resin with a circumferentially wrapped fibrous reinforcement material, a non-woven fibrous reinforcement material, a randomly orientated cut filament reinforcement or a combination thereof to enhance and maximize resistance to wicking. Seal 102 may be formed from an engineered material effective for preventing the transport of gas and liquid to outer annular ring. Seal 102 may be formed from any engineered material including elastomers such as rubber, a non-elastomer such as polytetrafluoroethylene (PTFE) or urethane, or any other suitable material without departing from the scope of the present invention. In addition, seal 102 may have a c-shaped, circular, or square cross-section, or any other suitable shape without departing from the scope of the present invention.

Seal 102, may also be a unitary seal, of dielectric means, constructed of two or more components, with material selectively embedded within the seal for supplementing mechanical performance.

Seal grooves 104 and 105 may be of any size or shape without departing from the scope of the present invention.

Annular disk 100d includes a plurality of annular rings that allows dielectric gasket 10g to be formed from multiple materials. In one embodiment, second annular ring 116 is formed from an electrically non-conducting material that is highly resistant to wicking, and first annular ring 114 is formed from a electrically non-conducting material that increases the stiffness and strength to resist cracking of dielectric gasket 10g.

Annular disk 100d reduces the effect of high compression loading on dielectric gasket log by reducing the opportunity for deformation of the electrically non-conducting material into flange channels 15. In addition, annular disk 100d provides stiffness to dielectric gasket 10 and reduces the possibility of a failure and blow-out of dielectric gasket 10g under pressure.

Annular disk 100d may incorporate stiffeners 60 and 61 or central stiffener 70 depicted in FIGS. 3 and 4 for the benefits previously recited.

Figure 6:
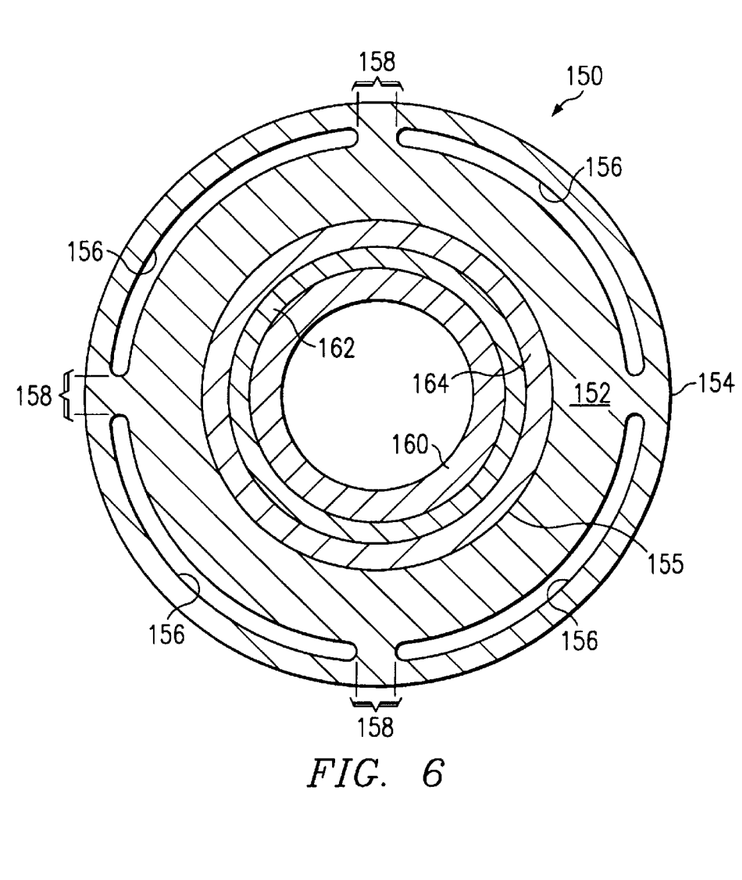
FIG. 6 is a schematic drawing in section illustrating a dielectric gasket in accordance with an embodiment of the present invention.

FIG. 6 shows a dielectric gasket with a stiffener having portions removed. The dielectric gasket indicated generally at 150 includes an inner annular disk 160, seal 162, outer annular disk 164, and stiffener 152. Inner annular disk 160 is preferably disposed within seal 162. Seal 162 is preferably disposed inside outer annular disk 164. In this particular embodiment, stiffener 152 is disposed within a groove formed in the exterior face of outer annular disk 164. In this embodiment a second stiffener (not expressly shown) may be disposed in a groove formed on the opposite face of outer annular disk 164.

Stiffener 152 includes four removed portions 156 near outside diameter 154 of stiffener 152. Remove portions 156 of stiffener 152 may be removed using a laser cutting technique, a water jet cutting technique, or another suitable manufacturing process. Between removed portions 156 are narrow paths 158. Narrow paths 158 are preferably formed to reduce the transfer of heat from the outer diameter 154 of stiffener 152 to the inside diameter 155 of stiffener 152 by limiting the size of the conductive path for heat to travel from the outer diameter to the inner diameter of stiffener 152.

In operation, dielectric gasket 150 is preferably installed between two flanges 12 and 14, as shown in FIG. 1. When outside diameter of installed dielectric gasket 150 is exposed to heat from a fire or another heat source, heat is generally conducted from the outside diameter 154 of stiffener 152 to the inside diameter 155 of stiffener 152 via narrow paths 158. The path of conduction along narrow path 158 effectively reduces the rate of heat transfer to the inside diameter 155 of outer annular disk 164, to seal 162, and to inner annular disk 160.

Portions 156 may be removed from stiffener 152 using a suitable machining or material removal technique. More particularly, portions 156 may be removed using a laser cutting technique or a water jet cutting technique. In one particular embodiment, material may also be removed from portions of outer annular disk 50a, 50b, or 50c as shown in FIGS. 2A, 3A and 4 adjacent to portions 156 removed from stiffener ring 152. Material may be removed from outer annular disk 50a, 50b, or 50c using a water jet cutting technique or another suitable technique. Material may be removed from outer annular disk 50a, 50b, and 50c and stiffener 152 in embodiments in which stiffener 152 is encapsulated within outer annular disk 50c as shown in FIG. 4 or in which more than one stiffener 152 may be disposed in faces 72 and 73 of outer annular disk 50b as shown in FIG. 3a. For example, in this embodiment a common portion of outer annular disk 164 and stiffener 152 may be removed using a water jet cutting technique or another suitable technique.

In the present embodiment, stiffener 152 extends to the outer diameter of outer annular disk 164. In an alternative embodiment, stiffener 152 may not extend to the outer diameter of outer annular disk. In another alternative embodiment stiffener 152 may be disposed in an encapsulated, medial position as described in FIG. 4. In another alternative embodiment, the size and number of removed portions 156 of stiffener 152 may be increased or decreased and arranged to reduce the transfer of heat across the associated stiffener.

Although the present invention has been described with several embodiments, various changes and modifications may be suggested to one skilled in the art. It is intended that the present invention encompass such changes and modifications that fall within the scope of the appended claims.

What is claimed is:

1. A dielectric gasket comprising:
   an outer annular disk having at least one portion formed from a rigid electrically non-conducting material, the outer annular disk having a first face and a second face, an inside diameter surface and an outside diameter surface;
   an inner annular disk having at least one portion formed from a rigid, electrically non-conducting material, the inner annular disk having a first face and a second face, an outside diameter surface, and an inside diameter surface, the inner annular disk being concentrically disposed within the inside diameter of the outer annular disk;
   a seal mechanically disposed between the inside diameter of the outer annular disk and the outside diameter of the inner annular disk operable to prevent the transport of gas and liquids from the inner annular disk to the outer annular disk, the seal having a face to face thickness greater than the inner annular disk and the outer annular disk and operable to deform into an available void volume when compressed;

the outside diameter surface of the inner annular disk formed to allow the seal to be slidably disposed inside of the outer annular disk and to substantially prohibit relative concentric and axial movement between the outer annular disk and the seal;

the inside diameter surface of the seal formed to allow the outside diameter surface of the inner annular disk to be slidably disposed inside of the seal with a fit that substantially prohibits relative concentric and axial movement between the seal and the inner annular disk;

the outer annular disk and the inner annular disk having a substantially equal thickness; and the seal operable to bridge the respective faces of the outer annular disk and the inner annular disk.

2. The dielectric gasket of claim 1 further comprising:

a first ring stiffener disposed in the first face of the outer annular disk;

a second ring stiffener disposed in the second face of the outer annular disk, the first ring stiffener separated from the second ring stiffener by a portion of the electrically non-conducting material;

the outer annular disk includes an outside diameter greater than the outside diameter of each ring stiffener; and an inside diameter of each ring stiffener greater than the inside diameter of the outer annular disk.

3. The dielectric gasket of claim 2 further comprising the first ring stiffener and the second ring stiffener manufactured from metal and the exposed face of each ring stiffener coated with a semi-hard engineered material.

4. The dielectric gaskets of claim 1 wherein the seal comprises a unitary seal, of dielectric means, constructed of two or more components, with material selectively embedded within the seal for supplementing mechanical performance of the seal.

5. The dielectric gasket of claim 1 further comprising the inner annular disk fabricated from a different electrically non-conducting material as compared to the outer annular disk.

6. The dielectric gasket of claim 1 further comprising:

the outer annular disk and the inner annular disk fabricated from electrically non-conducting fire resistant materials; and the seal fabricated from electrically non-conducting fire resistant materials.

7. The dielectric gasket of claim 6 further comprising the seal fabricated from commercially available flexible graphite materials.

8. The dielectric gasket of claim 1 further comprising:

an encapsulated, medial positioned central stiffener disposed in the external surface of the outer annular disk;

the central stiffener having face to face thickness less than that of the outer annular disk; and the central stiffener further having an inside diameter greater than or equal to the inside diameter of the outer annular disk and an outside diameter less than or equal to that of the outside diameter of the outer annular disk.

9. The dielectric gasket of claim 1 further comprising the inner annular disk and the outer annular disk fabricated from a the same electrically non-conducting material.

10. A dielectric gasket comprising;

an annular disk with at least one portion formed from an electrically non-conducting material and the annular disk having a first face and a second face;

at least one seal groove formed within the first face;

at least one seal groove formed within the second face;

a seal disposed within each first face seal groove;

a seal disposed within each second face seal groove;

the annular disk having a first annular ring manufactured from a first electrically non-conducting material;

the annular disk having a second annular ring manufactured from a second electrically non-conducting material to prevent transport of gas and liquids, the second annular ring being concentrically disposed within the first annular ring;

the electrically non-conducting materials of the first and second annular rings formed from a material from the group consisting of thermosetting resin, woven fibrous reinforcement material, and non-woven fibrous reinforcement material; and the seal grooves formed within the first face and the second face of the second annular ring wherein the seal is formed from engineered materials for preventing transport of gas and liquids to the first annular ring.

11. The dielectric gasket of claim 10 further comprising ring stiffeners disposed in the faces of the first annular ring.

12. The dielectric gasket of claim 10 further comprising a central stiffener encapsulated in the first annular ring.

13. The dielectric gasket of claim 10 further comprising at least one pressure communication passage connecting each of the seal grooves formed within the first face to corresponding seal grooves formed within the second face.

14. A dielectric gasket for use in a connection between a first pipe joint and a second pipe joint comprising:

an outer annular disk formed from an electrically non-conducting material having two substantially parallel faces, an inside diameter surface substantially perpendicular to the faces, and a rabbit groove formed on the edge of each face at the inside diameter;

an inner annular disk formed from an electrically non-conductive material having two substantially parallel faces, an outside diameter surface substantially perpendicular to the faces, and a rabbit groove formed on the edge of each face at the outside diameter, the inner annular disk being concentrically disposed within the inside diameter of the outer annular disk;

the inner annular disk and the outer annular disk having substantially equal thickness and formed from a single piece of electrically non-conducting material whereby the inner annular disk and outer annular disk form a matched set;

a seal disposed between the inside diameter of the outer annular disk and the outside diameter of the inner annular disk formed from an electrically non-conducting thermoplastic material, the outside diameter surface of the seal perpendicular to the faces of the seal and formed to allow the seal to be slidably disposed inside of the outer annular disk prohibiting relative concentric movement between the outer annular disk and the seal;

the seal further having a nubbin formed on the outside diameter of the seal at the edge of each face to substantially prohibit relative axial movement between the outer annular disk and the seal by registering each nubbin into the mating rabbit groove of the outer annular disk;

at least one circumferential groove disposed beneath and formed substantially parallel to each seal face within the inside diameter of the seal to allow the seal faces to deflect with cantilever like motion;

a circumferential pedestal axially centered between the seal faces and circumferential grooves with an inside diameter sized to allow the inner annular disk to be slidably disposed inside of the seal with a fit that substantially prohibits relative concentric movement between the seal and the inner annular disk;

the inside diameter of both seal faces formed to mate with the rabbit grooves of the inner annular disk to prohibit relative axial movement between the inner annular disk and the seal; and the face to face thickness of the seal greater than the face to face thickness of the inner annular disk and the outer annular disk.

15. The dielectric gasket of claim 14 further comprising:

the seal operable to deform into an available void volume of the circumferential groove when compressed; and the seal operable to bridge the respective faces of the outer annular disk and the inner annular disk when each nubbin on the outside diameter of the seal is compressed into the rabbit groove of the outer annular disk and when the cantilevered seal faces are compressed into the rabbit grooves of the inner annular disk.

16. The dielectric gasket of claim 14 further comprising the seal formed from engineered materials selected to prevent wicking of gas and liquids to the outer annular disk.

17. The dielectric gasket of claim 16 further comprising the seal formed from engineered materials selected from the group consisting of thermoplastics and elastomers.

18. The dielectric gasket of claim 14 further comprising:

an encapsulated, medial positioned central stiffener disposed in the external surface of the outer annular disk;

the central stiffener having face to face thickness less than that of the outer annular disk; and the central stiffener further having an inside diameter greater than or equal to the inside diameter of the outer annular disk and an outside diameter less than or equal to that of the outside diameter of the outer annular disk.

19. The dielectric gasket of claim 18 further comprising the central stiffener having at least one portion removed for reducing the transfer of heat across the stiffener.

20. The dielectric gasket of claim 19 further comprising the outer annular disk having at least one portion removed corresponding to the at least one portion removed from the central stiffener.

21. The dielectric gasket of claim 18 further comprising the central stiffener having at least one portion removed by a laser cutting technique.

22. The dielectric gasket of claim 18 further comprising the central stiffener and the outer annular disk having at least one portion removed by a water jet cutting technique.

23. The dielectric gasket of claim 18 further comprising the central stiffener manufactured from the group consisting of standard sheet metal products engineered sheet metal products, and bi-metallic sheet metal products.

24. The dielectric gasket of claim 23 wherein the central stiffener comprises a flat shape.

25. The dielectric gasket of claim 23 wherein the central stiffener comprises a contoured shape.

26. The dielectric gasket of claim 23 further comprising at least one punched hole formed within the central stiffener.

27. The dielectric gasket of claim 23 further comprising the central stiffener having at least one portion removed by a laser cutting technique.

28. The dielectric gasket of claim 23 further comprising the central stiffener and the outer annular disk having at least one common portion removed by a water jet cutting technique.

29. The dielectric gasket of claim 14 wherein the outer annular disk further comprises:

a first face with a facial groove and a second face with a facial groove;

two ring stiffeners, manufactured from metal, having a face to face thickness less than one half of the thickness of the outer annular disk, an inside diameter greater than that of the outer annular disk and an outside diameter less than or equal to the outer diameter of the outer annular disk;

the ring stiffeners disposed in each groove, substantially flush with the face of the outer annular disk, the inside and outside diameters of the ring stiffener adjacent to the respective mating surfaces in the groove; and the ring stiffeners separated from one another by a portion of the electrical non-conducting material.

30. The dielectric gasket of claim 29 further comprising the ring stiffeners manufactured from materials selected from the group consisting of standard sheet metal products, engineered sheet metal products, and bi-metallic sheet metal products.

31. The dielectric gasket of claim 29 wherein the ring stiffeners further comprise a generally flat surface.

32. The dielectric gasket of claim 29 wherein the ring stiffeners further comprise a generally contoured surface.

33. The dielectric gasket of claim 29 further comprising the ring stiffeners having at least one portion removed for reducing the transfer of heat across the stiffener.

34. The dielectric gasket of claim 33 further comprising the annular disk having at least one portion removed corresponding to the at least one portion removed from the central stiffeners.

35. The dielectric gasket of claim 29 further comprising the ring stiffeners having at least one punched hole extending therethrough.

36. The dielectric gasket of claim 29 further comprising the ring stiffener having at least one portion removed by a laser cutting technique.

37. The dielectric gasket of claim 29 further comprising the outer annular disk and the ring stiffener having at least one common portion removed by a water jet cutting technique.

* * * * *

UNITED STATES PATENT AND TRADEMARK OFFICE
CERTIFICATE OF CORRECTION

PATENT NO. : 6,402,159 B1
DATED : June 11, 2002
INVENTOR(S) : Gary A. Kohn

It is certified that error appears in the above-identified patent and that said Letters Patent is hereby corrected as shown below:

<u>Title page,</u>
Item [63], Related U.S. Application Data, please delete "Mar. 27, 1999", and replace with -- Mar. 27, 1998 --.

Signed and Sealed this

Thirtieth Day of July, 2002

*Attest:*

*Attesting Officer*

JAMES E. ROGAN
*Director of the United States Patent and Trademark Office*